US009531430B2

(12) United States Patent
Morche et al.

(10) Patent No.: US 9,531,430 B2
(45) Date of Patent: Dec. 27, 2016

(54) DEVICE AND METHOD FOR DETERMINING THE ARRIVAL TIME OF A UWB SIGNAL

(71) Applicant: Commissariat A L'Energie Atomique et aux Energies Alternatives, Paris (FR)

(72) Inventors: Dominique Morche, Meylan (FR); Alfredo-Farid Bautista Delgado, Grenoble (FR)

(73) Assignee: Commissariat a l'energie atomique et aux energies alternatives, Paris (FR)

( * ) Notice: Subject to any disclaimer, the term of this patent is extended or adjusted under 35 U.S.C. 154(b) by 0 days.

(21) Appl. No.: 14/695,283

(22) Filed: Apr. 24, 2015

(65) Prior Publication Data

US 2015/0311945 A1 Oct. 29, 2015

(30) Foreign Application Priority Data

Apr. 25, 2014 (FR) ...................... 14 53765

(51) Int. Cl.
*H04B 1/00* (2006.01)
*H04B 1/7073* (2011.01)
*H04B 1/69* (2011.01)
*H04L 25/49* (2006.01)

(52) U.S. Cl.
CPC .............. *H04B 1/7073* (2013.01); *H04B 1/69* (2013.01); *H04L 25/4902* (2013.01); *H04B 2201/7073* (2013.01); *H04B 2201/71634* (2013.01)

(58) Field of Classification Search
CPC .. H04B 1/69; H04B 1/7073; H04B 2201/7073
See application file for complete search history.

(56) References Cited

U.S. PATENT DOCUMENTS

| 2005/0141602 A1* | 6/2005 | Hyun | .................. H04B 1/7174 375/219 |
| 2008/0150628 A1* | 6/2008 | Padure | .................. H03F 1/303 330/10 |
| 2012/0110832 A1 | 5/2012 | Morche | |

(Continued)

FOREIGN PATENT DOCUMENTS

EP    1 580 901 A1    9/2005

OTHER PUBLICATIONS

French Preliminary Search Report issued Dec. 10, 2014 in French Application 14 53765, filed on Apr. 25, 2014 ( with English Translation of Categories of Cited Documents).

(Continued)

*Primary Examiner* — Shuwang Liu
*Assistant Examiner* — Gina McKie
(74) *Attorney, Agent, or Firm* — Oblon, McClelland, Maier & Neustadt, L.L.P.

(57) ABSTRACT

A device and a method for determining the arrival time of a UWB signal including at least one pulse modulated at a carrier frequency. The receiver includes a frequency translation stage for translating the UWB signal to a first intermediate frequency and a second intermediate frequency. In an integration stage, the signals translated to the first intermediate frequency and to the second intermediate frequency are integrated on a time window to give a first integration result and a second integration result respectively. The phase deviation is determined between the first and second integration results and from this phase deviation, the arrival time of the UWB signal is deduced.

11 Claims, 5 Drawing Sheets

(56) References Cited

U.S. PATENT DOCUMENTS

2014/0204977 A1    7/2014  Morche
2015/0295620 A1*  10/2015  Dehmas .................. H04B 1/69
                                                        375/138

OTHER PUBLICATIONS

Gilles Masson et al. "A 1 nJ/b 3.2-to-4.7 GHz UWB 50 Mpulses/s Double Quadrature Receiver for Communication and Localization", IEEE, 2010, 4 pages.
Dominique Morche et al. "Double-Quadrature UWB Receiver for Wide-Range Localization Applications With Sub-cm Ranging Precision", IEEE Journal of Solid-State Circuits, vol. 48, No. 10, 2013, 12 pages.

* cited by examiner

DEVICE AND METHOD FOR DETERMINING THE ARRIVAL TIME OF A UWB SIGNAL

TECHNICAL FIELD

The present invention relates to the field of UWB (Ultra Wide Band) receivers. It relates both to UWB telecommunication systems and distance measuring systems using a UWB signal.

STATE OF PRIOR ART

Pulsed type ultra wide band (UWB) telecommunication systems are well known from the state of the art. In such a system, a symbol emitted by a transmitter is transmitted using a sequence of ultra-short pulses, in the order of one nanosecond to about a hundred picoseconds.

Figure 1A:
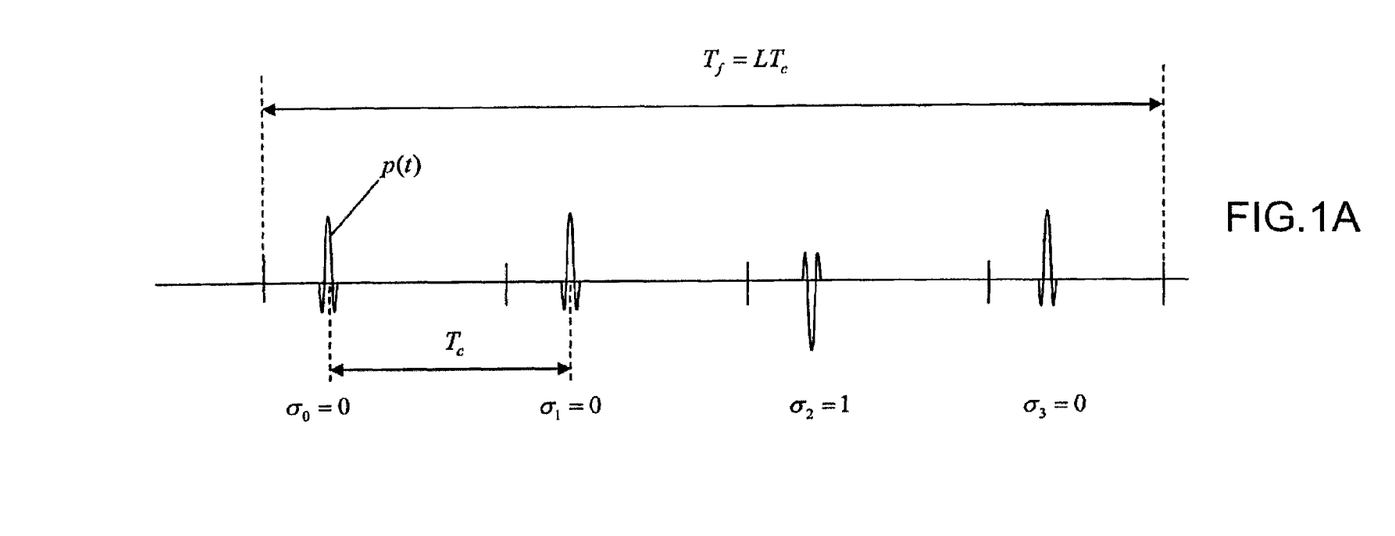
FIG. 1A, already described, represents an exemplary pulsed type UWB signal.

FIG. 1A schematically illustrates the signal transmitted by a UWB transmitter, corresponding to a given information symbol. This signal consists of pulses being repeated with a repetition period $T_c$.

The signal emitted by the transmitter, in the absence of modulation by modulation symbols, can be expressed in the following way:

$$s_{Tx}(t) = \sum_{k=0}^{L-1} (-1)^{\sigma_k} p(t-kT_c)\cos(2\pi f_0(t-kT_c)+\varphi_0) \quad (1)$$

where p(t) is the form of the unit pulse into baseband, $f_0$ is the carrier frequency, $\varphi_0$, the phase at the origin, and $T_c$ the repetition period, and $\sigma = \sigma_0, \ldots, \sigma_{L-1}$ is a pseudo-random binary sequence. The duration $\tau$ of the unit pulse p(t) is substantially lower than the duration of the period $T_c$.

This base signal can be amplitude and/or position modulated to transmit one modulation symbol per frame consisting of a given number of repetition periods. This frame is of a duration $T_f = LT_c$ where L is the number of periods in the frame. For example, if the modulation is a Pulse Position Modulation (PPM), the modulated signal can be expressed as:

$$s_{Tx}(t) = \sum_{k=0}^{L-1} (-1)^{\sigma_k} p(t-kT_c-m\varepsilon)\cos(2\pi f_0(t-kT_c-m\varepsilon)+\varphi_0) \quad (2)$$

where $\varepsilon$ is a modulation delay substantially lower than the period $T_c$ and $m=0, \ldots, M-1$ gives the value of the PPM symbol, in other words its time position. The PPM modulation alphabet consists here of $\delta(t-m\varepsilon)$, with $m=0, \ldots, M-1$ where $\delta$ is the Dirac symbol.

In a similar way, a symbol can be transmitted by the UWB transmitter by means of an amplitude or phase modulation in which case the modulated signal can then be expressed as:

$$s_{Tx}(t) = \sum_{k=0}^{L-1} a_m(-1)^{\sigma_k} p(t-kT_c)\cos(2\pi f_0(t-kT_c)+\varphi_0) \quad (3)$$

where $a_m$ is the symbol to be transmitted, for example a PAM (Pulse Amplitude Modulation) or (D)BPSK (Differential Binary Phase Shift Keying) symbol.

To separate the transmissions of different transmitters, each transmitter can be provided to be associated with a given time hopping code $c_k$, $k=0, \ldots, L-1$, $c_k \in \{0, \ldots, L-1\}$, with the proviso that the codes relating to different transmitters are orthogonal.

Figure 1B:
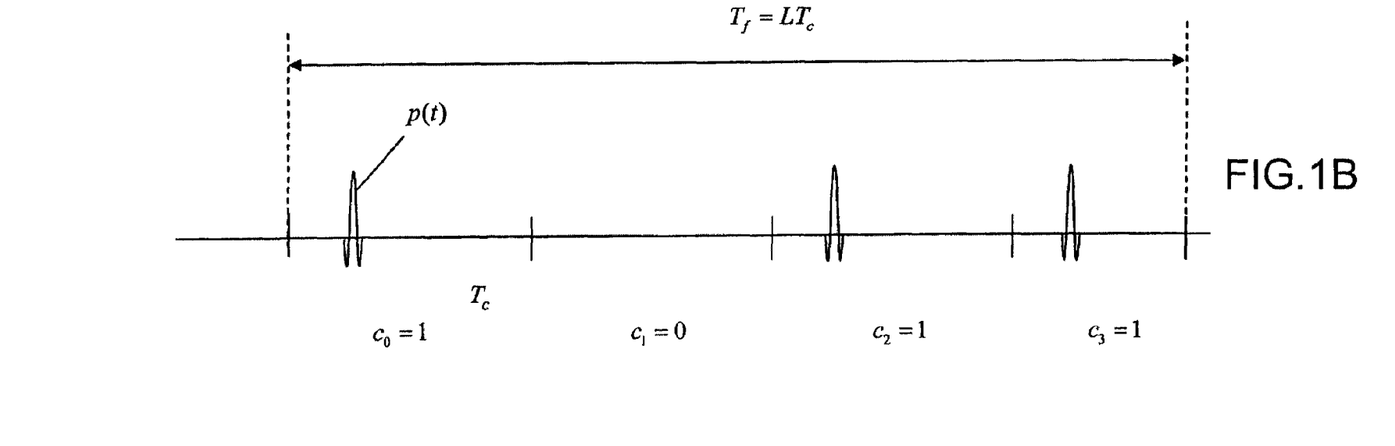
FIG. 1B, already described, represents an exemplary pulsed type UWB signal coded by a time hopping code.

FIG. 1B illustrates the non-modulated signal of a transmitter using a time hopping code. To simplify, it has been assumed here that the elements $\sigma_k$ of the pseudo-random sequence were all equal to 1.

When it is modulated by a position modulation or an amplitude modulation, the transmitted signal is then respectively written as:

$$s_{Tx}(t) = \sum_{k=0}^{L-1} p(t-c_kT_c-m\varepsilon)\cos(2\pi f_0(t-kT_c-m\varepsilon)+\varphi_0) \quad (4)$$

and $$s_{Tx}(t) = a_m\sum_{k=0}^{L-1} p(t-c_kT_c)\cos(2\pi f_0(t-kT_c)+\varphi_0) \quad (5)$$

In certain receiver types or when it is desired to carry out a distance measurement, the receiver has to precisely determine the arrival times of the UWB pulses received. Indeed, the receiver does not generally a priori know in which time windows the UWB pulses appear (absence of a synchronization reference and, optionally, ignorance of the time hopping code used). Furthermore, when a PPM (Pulse Position Modulation) modulation is used, the arrival time of the pulse carries the modulation information and therefore has to be precisely determined.

Besides, the very low pulse duration of the pulsed UWB signals makes them excellent candidates for distance measurement and radiolocation. Regardless of the considered principle of the distance measuring system (round-trip propagation time for example) or radiolocation (propagation time difference for example), it is essential to be able to precisely determine the arrival time of a UWB pulse.

A first method for determining the arrival time of a UWB pulse consists in carrying out an integration of the signal received, after translation into baseband, in a plurality of consecutive time windows.

Figure 2:
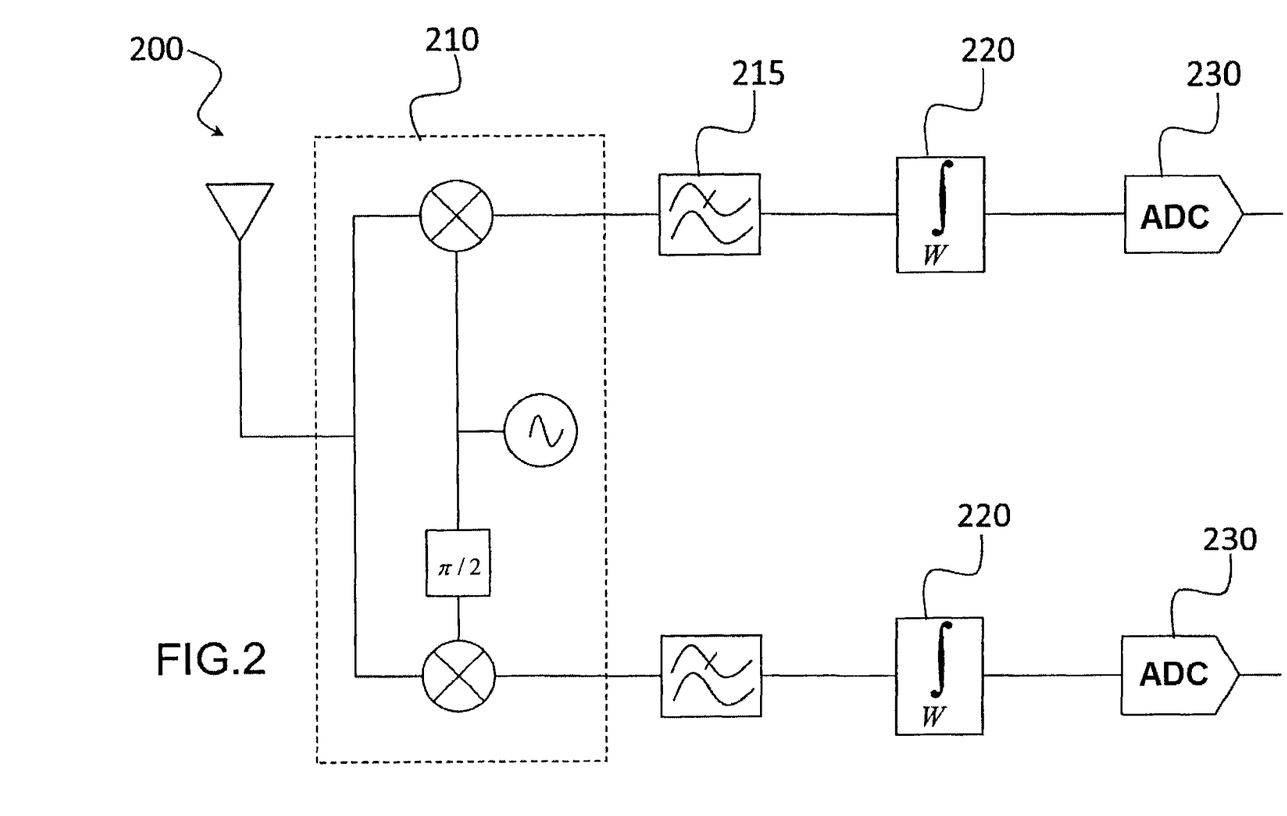
FIG. 2, already described, schematically represents the structure of a first UWB receiver enabling the presence of a UWB pulse to be detected in a time window.

FIG. 2 describes a UWB receiver, 200, used by this method for determining an arrival time.

It comprises a frequency conversion stage for translating the signal into baseband, 210, a low pass filtering stage 215, followed, for each of the I and Q channels, by an integrator in a time window, 220 (or in a plurality of time windows which are distributed according to the relative time positions of the expected pulses). The time windows follow each other at a frequency F, and the integration results on both channels are analog-digital converted in the conversion stage 230.

However, to obtain a high arrival time accuracy, with a relatively brief pulse width, it is necessary to select windows the duration of which is short. A great number of integrations (on a great number of windows) has thus to be carried out, which results in a very high rate at the output of the conversion stage.

Patent application EP-A-1580901 provides a method for detecting the arrival time of a pulse inside a time window which enables a window having a higher duration to be used and thus does not require a great number of integrations to be carried out.

Figure 3:
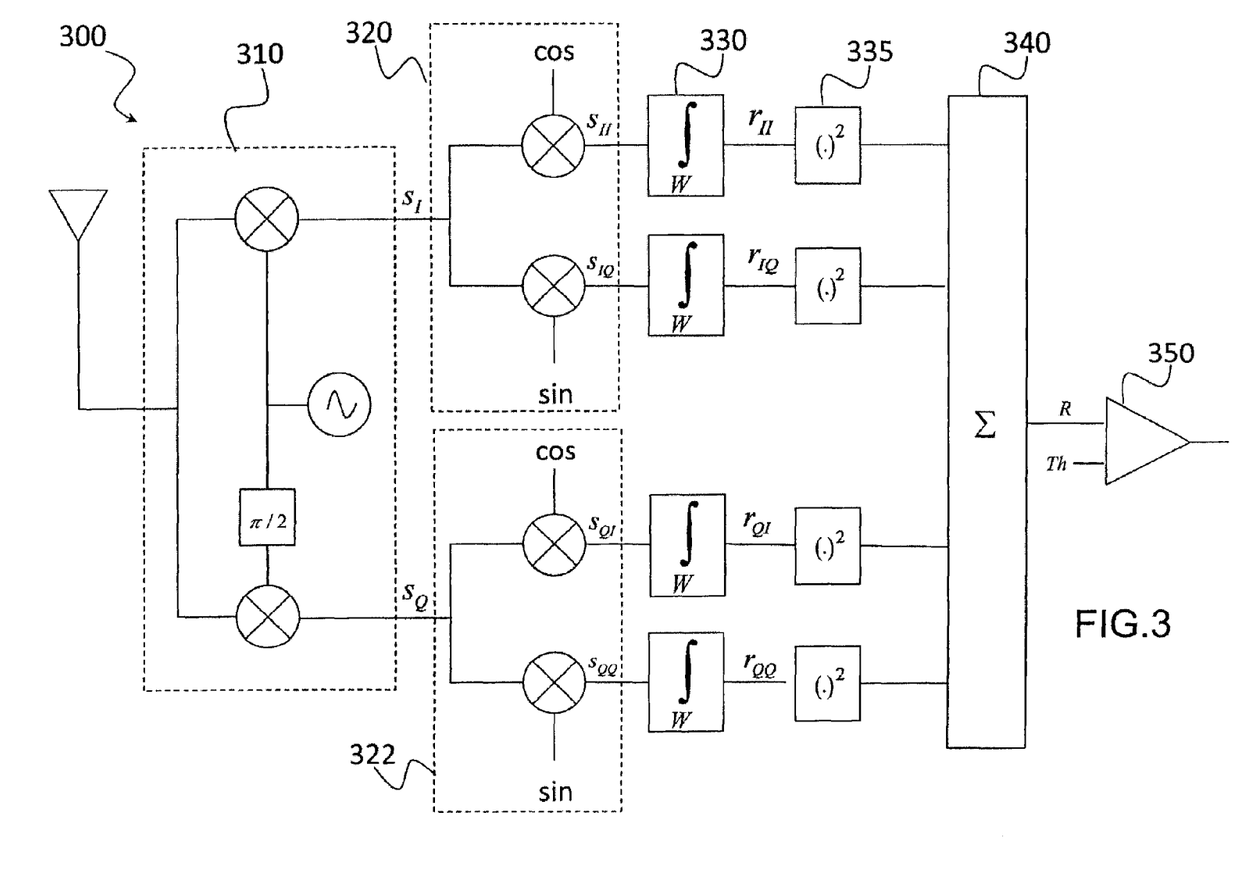
FIG. 3, already described, schematically represents the structure of a second UWB receiver enabling the presence of a UWB pulse to be detected in a time window.

The principle of this method is illustrated in FIG. 3. It uses a UWB receiver, 300, comprising a first frequency translation stage for bringing back the signal into baseband, 310, a band-pass or low-pass filtering stage (not represented) followed, for each of the I and Q channels, by a correlation stage with two low frequency quadrature sinusoids. More precisely, the quadrature mixer 320 carries out a projection of the in-phase signal, noted $s_I$, on a base consisting of two low frequency orthogonal sinusoids. In a similar way, the quadrature mixer 322 carries out a projection of the quadrature signal on this same base. Each quadrature mixer comprises a first unit mixer with a first signal of the base (herein a cosinusoidal signal) and a second unit mixer with a second signal of the base (herein a sinusoidal signal), orthogonal to the first one. The signals obtained by projection, noted $s_{II}$, $s_{IQ}$ for the I channel and $s_{QI}$, $s_{QQ}$ for the Q channel, are integrated inside a detection time window, by means of the integrators 330. Optionally, the integration results are accumulated on a plurality of time windows, which are separated by the repetition period of the UWB signal or offset according to a time hopping code. The integrated signals are quadratically summed in 335, 340 and the sum thus obtained is compared with a threshold value in 350. If the sum obtained exceeds the threshold value, the receiver concludes that a pulse has been received in the time window. The architecture of the UWB receiver 300 is a so-called double quadrature architecture.

The double quadrature UWB receiver enables a UWB pulse to be located in the detection time window.

The article of G. Masson et al. entitled "A 1 nJ/b 3.2 to 4.7 GHz UWB 50 Mpulses/s double quadrature receiver for communication and localization" published in Proc. of the ESSCIRC 2010, 14-16 Sep. 2010, pp. 502-505, describes the architecture of such a double quadrature receiver and mentions the possibility of using correlation signals with low frequency sinusoids to deduce the arrival time (ToA) of the UWB pulse in the detection time window.

The double quadrature architecture has however drawbacks.

First, this architecture is complex in that it requires two further quadrature mixers (with respect to an architecture of a conventional UWB receiver) to carry out the projection on the orthogonal base. Further, this architecture requires twice as many integrators and analog/digital converters, hence an increased energy consumption. Furthermore, this architecture degrades the signal to noise ratio of the receiver.

Then, this architecture is not compatible with the architecture of a conventional UWB receiver.

Finally, the orthogonal projection stage which requires relatively linear mixers degrades the noise figure of the receiver because of further noise generated by the mixers. The signal to noise ratio at the output of the receiver is lower and the sensitivity of the receiver is consequently degraded, all the more that the width of the time window is larger.

The purpose of the present invention is consequently to provide a method and a device for determining the arrival time of a UWB signal which do not require a substantially more complex architecture than a conventional UWB receiver, while ensuring a great measurement accuracy.

DISCLOSURE OF THE INVENTION

The present invention is defined by a device for determining the arrival time of a UWB signal comprising at least one pulse modulated at a carrier frequency, said device comprising:

at least one translation stage for translating to an intermediate frequency comprising a quadrature mixer comprising two I and Q mixing channels;

at least one integration stage connected to a translation stage, for integrating the signals delivered on the I and Q channels on a time window and providing integration results for each of the I and Q channels respectively; and means for controlling said at least one translation and integration stage for:

carrying out a first frequency translation of the UWB signal to a first intermediate frequency followed by an integration of the signal thus translated on a first time window to obtain first integration results $r_I^1$, $r_Q^1$;

carrying out a second frequency translation of the UWB signal to a second intermediate frequency, different from the first intermediate frequency, followed by an integration of the signal thus translated on a second time window to obtain second integration results $r_I^2$, $r_Q^2$;

calculating means for calculating a first phase value $\Theta^1$ from the first integration results according to $$\Theta^1 = \operatorname{Arctan}\left(\frac{r_Q^1}{r_I^1}\right),$$

a second phase value $\Theta^2$ from the second integration results according to $$\Theta^2 = \operatorname{Arctan}\left(\frac{r_Q^2}{r_I^2}\right)$$

and deducing therefrom a phase deviation $\Delta\Theta = \Theta^2 - \Theta^1$, said calculating means determining the arrival time of the UWB signal from the phase deviation thus obtained by means of a predetermined function.

According to a first embodiment, the first and second time windows are combined into a single window and the latter is chosen to contain said pulse.

In this case, said arrival time, counted from the beginning of the single window, is estimated by:

$$t_a = \frac{\Delta\Theta}{2\pi(\Delta f_2 - \Delta f_1)}$$

where $\Delta\Theta$ is the phase deviation, $\Delta f_1$ is the first intermediate frequency and $\Delta f_2$ is the second intermediate frequency.

According to a second embodiment, said UWB signal comprises a first pulse followed by a second pulse, the first time window is chosen to comprise the first pulse and the second time window is chosen to comprise the second pulse.

In this case, said arrival time, counted from the beginning of the first time window is estimated by:

$$t_a = \frac{\Delta\Theta - 2\pi f_0 \Delta t_i - 2\pi \Delta f_2 \delta t_{21}}{2\pi(\Delta f_2 - \Delta f_1)}$$

where $\Delta\Theta$ is the phase deviation, $f_0$ is the carrier frequency, $\Delta f_1$ is the first intermediate frequency, $\Delta f_2$ is the second intermediate frequency, $\Delta t_i$ is the time interval separating two pulses, $\delta t_{21} = \Delta t_i - \Delta t_w$ where $\Delta t_w$ is the time interval separating the first and second time windows.

The invention also relates to a device for determining the arrival time of a UWB signal comprising a first pulse modulated at a carrier frequency, followed by a second pulse modulated at a second carrier frequency, said device comprising:
- a translation stage for translating to an intermediate frequency comprising a quadrature mixer comprising two I and Q mixing channels;
- an integration stage connected to said translation stage, for integrating the signals delivered on the I and Q channels on a time window and providing integration results for each of the I and Q channels respectively; and
- means for controlling the translation stage and the integration stage for:
  - carrying out a first frequency translation of the UWB signal at an intermediate frequency followed by an integration of the signal thus translated on a first time window to obtain first integration results $r_I^1$, $r_Q^1$;
  - carrying out a second frequency translation of the UWB signal to said intermediate frequency, followed by an integration of the signal thus translated on a second time window to obtain second integration results $r_I^2$, $r_Q^2$;
- calculating means for calculating a first phase value $\Theta^1$ from the first integration results according to $$\Theta^1 = \text{Arctan}\left(\frac{r_Q^1}{r_I^1}\right),$$

a second phase value $\Theta^2$ from the second integration results according to $$\Theta^2 = \text{Arctan}\left(\frac{r_Q^2}{r_I^2}\right)$$

and deducing therefrom a phase deviation $\Delta\Theta=\Theta^2-\Theta^1$, said calculating means determining the arrival time of the UWB signal from the phase deviation thus obtained by means of a predetermined function.

The intermediate frequency can for example be the median frequency between the first and second carrier frequencies.

Advantageously, the time interval between the first and second time windows is selected equal to the time interval between the first and second pulses, the arrival time of the UWB signal, counted from the beginning of the first time window being then estimated by:

$$t_a = t_a^{min} + \frac{\Delta\Theta - \Delta\Theta_{min}}{\Delta\Theta_{max} - \Delta\Theta_{min}}\Delta T$$

where $\Delta\Theta_{min}$ and $\Delta\Theta_{max}$ are phase deviations obtained for a first arrival time $t_a^{min}$ and a second arrival time $t_a^{max}$, respectively, and $\Delta T = t_a^{max} - t_a^{min}$.

Said predetermined function can be given by a calibration curve providing the phase deviation as a function of the arrival time of the signal.

This curve can be obtained by means of a statistics of the phase deviation values as a function of the arrival time of the signal, in the absence of synchronization of the transmitter and the receiver.

BRIEF DESCRIPTION OF THE DRAWINGS

Further characteristics and advantages of the invention will appear upon reading a preferential embodiment of the invention made in reference to the appended figures in which.

DETAILED DISCLOSURE OF PARTICULAR EMBODIMENTS

A receiver intended to receive a pulsed UWB signal will be considered in the following. This pulsed signal can be coded by a time hopping code or not, non-modulated or modulated by modulation symbols belonging to a position, amplitude or phase modulation alphabet or other, as set out in the introductory part. Without loss of generality, it will be assumed in the following that the pulsed signal is non-modulated.

A pulse of the pulsed signal can be generally written as:

$$P(t)=A\cdot\cos(2\pi f_o(t-t_i)+\phi)G(t) \qquad (6)$$

where G(t) is the pulse envelope, generally modeled by a Gaussian function, that is:

$$G(t) = \exp\left(-\left(\frac{t-t_{peak}}{\tau}\right)^2\right) \qquad (7)$$

where A is the amplitude of the pulse transmitted, $f_0$ is the carrier frequency (or center frequency), $t_{peak}$ is the instant when the envelope is maximum, $\tau$ is a parameter defining the pass-band of the pulse, $t_i$ is the transmission time and $\phi$ is the phase of the signal when transmitted.

The signal received by the receiver, after a propagation time $t_d$ can be written as:

$$R(t) = A\cdot\cos(2\pi f_0(t-t_i-t_d)+\varphi)\exp\left(-\left(\frac{t-t_{peak}-t_d}{\tau}\right)^2\right) \qquad (8)$$

Figure 4:
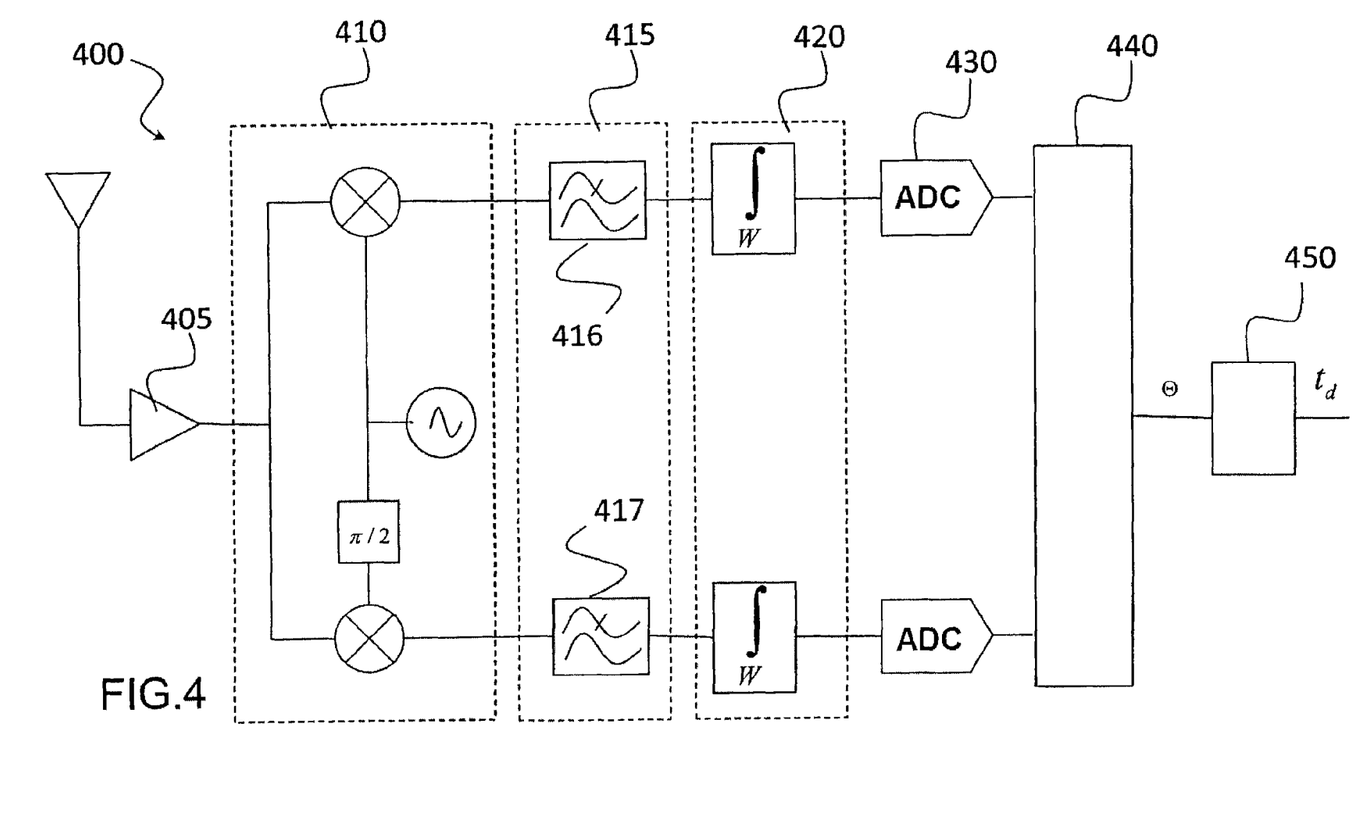
FIG. 4 schematically represents the structure of a device according to a first embodiment.

FIG. 4 represents a device according to one embodiment of the invention. This device is a UWB receiver having a structure with a single mixing stage, just like the receiver of FIG. 2. More precisely, the receiver comprises an RF filter (not represented), a low noise amplifier, 405, followed by a translation stage for translating to an intermediate frequency, 410, a band-pass or low-pass filtering stage (the low-pass alternative has been represented in the figure), 415, an integration stage for integrating on a time window, 420, and an analog-digital conversion stage, 430.

However, unlike the receiver of FIG. 2, samples of the I and Q channels, at the output of the conversion stage, are provided to a phase deviation estimating module (first calculating means), 440.

The arrival time of the UWB signal is then obtained from the phase deviation thus estimated, by second calculating means, 450, as explained hereinafter.

The frequency translation stage is suitable for carrying out a first frequency translation to a first intermediate frequency, $\Delta f_1$, and a second frequency translation to a second intermediate frequency, $\Delta f_2$. For example, if the pulsed signal contains pulses at a carrier frequency, $f_0$, the frequency translation stage can carry out a first quadrature mixing with a local oscillator at the frequency $f_0 + \Delta f_1$, and a second quadrature mixing with a local oscillator at the frequency $f_0 + \Delta f_2$. This mixing can be carried out in parallel, that is with two quadrature mixers arranged in parallel (alternative not represented), or sequentially with a single quadrature mixer, by switching the frequency of the oscillator between two pulses of the pulsed signal. Controlling means (not represented) enable the frequency translation stage to be controlled to obtain the first and second frequency translations.

The filtering stage, 415, is made by means of two bandpass or low-pass filters, 416 and 417, respectively placed on the I and Q channels, as indicated in FIG. 4. Alternatively, it can be made using a complex filter, operating on the I+jQ signal, in a known manner per se.

Finally, the integration stage 420 can be placed downstream of the analog-digital conversion stage instead of being placed upstream as indicated in FIG. 4. In such a case, the data rates at the output of the analog-digital conversion stage, 430, are high and the integration is made in digital mode with a high accuracy level. In any case, the integration time window is chosen to contain a pulse of the UWB signal, for example by carrying out, during a prior research phase, a measurement of the energy received on a plurality of successive time windows, a time window having an energy level higher than a predetermined energy threshold being then retained. The aforesaid controlling means enable the integration stage and in particular the time window(s) to be also controlled.

The pulsed signal translated to the intermediate frequency $\Delta f$ by means of the quadrature mixer can be expressed as, for the in-phase channel:

$$I(t) = \frac{A}{2} \cdot \cos(2\pi \Delta f (t - t_d) + \Phi) \exp\left(-\left(\frac{t - t_{peak} - t_d}{\tau}\right)^2\right) \quad (9)$$

and for the quadrature channel:

$$Q(t) = \frac{A}{2} \cdot \sin(2\pi \Delta f (t - t_d) + \Phi) \exp\left(-\left(\frac{t - t_{peak} - t_d}{\tau}\right)^2\right) \quad (10)$$

with $\Phi = 2\pi f_0(-t_i - t_d) + \phi - \alpha$, where $\alpha$ is the local oscillator phase.

Given that the phase of the I and Q signals does not vary much during the very brief duration of the UWB pulse, the integration results of the I and Q channels at the output of the digital-analog conversion stage can be approximated by:

$$r_I = K \cos(-2\pi \Delta f \cdot t_a + \Phi) = K \cos(\Theta) \quad (9')$$

and $$r_Q = K \sin(-2\pi \Delta f \cdot t_a + \Phi) = K \sin(\Theta) \quad (10')$$

where K is a constant and $t_a = t_d - t_w$ is the arrival time of the UWB signal, that is the time position of the UWB pulse in the time window (the time window beginning at the instant $t_w$. It will be noted that in the present case, the time reference is chosen at the beginning of the integration time window but, of course, another time reference could be chosen without departing from the scope of the present invention.

The phase deviation estimation module, 440 deduces from the integration results on the I and Q channels, the phase of the pulsed signal integrated on the window:

$$\Phi - 2\pi \Delta f \cdot t_a = \operatorname{Arctan}\left(\frac{r_Q}{r_I}\right) \quad (11)$$

It will be assumed that the phase $\Phi$ does not depend on the intermediate frequency $\Delta f$. Indeed, since the signals of the local oscillators are obtained from a same mother clock, the $\alpha$ values for $\Delta f_1$ and $\Delta f_2$ are known and the case where they are identical can always be considered by means of a simple predetermined phase shift.

When the signal is translated to a first intermediate frequency, $\Delta f_1$, and to a second intermediate frequency, $\Delta f_2$, the phase deviation estimation module estimates the phase of the pulsed signal for the first intermediate frequency and the second intermediate frequency, that is:

$$\Theta^1 = \Phi - 2\pi \Delta f_1 \cdot t_a = \operatorname{Arctan}\left(\frac{r_Q^1}{r_I^1}\right) \quad (12\text{-}1)$$

$$\Theta^2 = \Phi - 2\pi \Delta f_2 \cdot t_a = \operatorname{Arctan}\left(\frac{r_Q^2}{r_I^2}\right) \quad (12\text{-}2)$$

It will be noted that the expressions (12-1) and (12-2) are valid to within a $\pi$ multiple. The phase deviation can then be calculated:

$$\Delta\Theta = \Theta^2 - \Theta^1 = \operatorname{Arc tan}\left(\frac{r_Q^2}{r_I^2}\right) - \operatorname{Arc tan}\left(\frac{r_Q^1}{r_I^1}\right) \quad (13)$$

this phase deviation being also defined to within $\pi$ multiple.

The arrival time of the UWB signal is then given by the calculating means 450:

$$t_a = \frac{\Delta\Theta}{2\pi(\Delta f_2 - \Delta f_1)} \quad (14)$$

If the frequency deviation $|\Delta f_2 - \Delta f_1|$ is chosen sufficiently low, that is such that $$|\Delta f_2 - \Delta f_1| \cdot T_W < \frac{1}{2},$$

the estimation of the arrival time using the expression (14) is devoid of ambiguity.

The embodiment previously described implements a pulsed signal transmitted at a carrier frequency, translated in reception, to a first intermediate frequency and to a second intermediate frequency, the frequency translation being performed in parallel.

According to a preferred alternative of the first embodiment, the pulsed signal comprises at least two successive pulses, of a same carrier frequency. The first pulse is translated to a first intermediate frequency, $\Delta f_1$, and the second pulse is translated to a second intermediate frequency, $\Delta f_2$, using the same quadrature mixer. The frequencies $f_0+\Delta f_1$ and $f_0+\Delta f_2$ can be generated by two local oscillators, switched between both pulses. Alternatively, a frequency synthesizer connected to the mixer successively generates $f_0+\Delta f_1$ and $f_0+\Delta f_2$ and provides them to the mixer. After frequency translation, the first pulse is integrated in a first time window and the second pulse is integrated in a second time window. The first and second time windows are chosen to contain the first and second pulses respectively. Preferably, the first and second time windows are chosen so as to be separated by the time interval between the first and second pulses. Thus, it is ensured that if the first time window contains the first pulse (as indicated in the first embodiment), the second time window does contain the second pulse (the energy level received in the second window can be compared with the predetermined energy level to check it) and vice versa. Once again, the controlling means enable the frequency translation stage and the integration stage to be controlled.

In this case, the expressions (12-1) and (12-2) become respectively:

$$\Phi^1 - 2\pi \Delta f_1 . t_a^1 = \text{Arc tan}\left(\frac{r_Q^1}{r_I^1}\right) \quad (15\text{-}1)$$

and $$\Phi^2 - 2\pi \Delta f_1 . t_a^2 = \text{Arc tan}\left(\frac{r_Q^2}{r_I^2}\right) \quad (15\text{-}2)$$

where $t_a^1$ is the time position of the first pulse with respect to the beginning of the first window and $t_a^2$ is the time position of the second pulse with respect to the beginning of the second window, $\Phi^1-\Phi^2=2\pi f_0 \Delta t_i$ where $\Delta t_i$ is the time interval separating both pulses, which is assumed to be known. Optionally, the calculation of the phase $\Phi^1$ according to (15-1) can be performed for a first series of N pulses and the phases thus obtained can be averaged. Likewise, the calculation of the phase $\Phi^2$ can be performed for a second series of N pulses and the phases obtained can also be averaged. In this case, $\Delta t_i$ represents the time interval separating both series of pulses. The first and second series of pulses could be successive or even interlaced.

Since $\delta t_{21}=t_a^2-t_a^1=\Delta t_i-\Delta t_w$ where $\Delta t_w$ is the time interval separating the first and second time windows, it is possible to calculate the arrival time of the UWB signal, from:

$$t_a = \frac{\Delta\Theta - 2\pi f_0 \Delta t_i - 2\pi \Delta f_2 \delta t_{21}}{2\pi(\Delta f_2 - \Delta f_1)} \quad (16)$$

where the arrival time of the UWB signal is herein counted with respect to the beginning of the first time window. In the particular case where the time interval between the pulses is an integer multiple of the period of the carrier and where the time interval between the time windows is equal to the time interval between the pulses ($\delta t_{21}=0$), an evaluation of the arrival time is retrieved according to the simplified expression (14).

According to a second embodiment of the invention, the pulsed signal comprises pulses transmitted at least two different center frequencies, referred to as first and second frequencies hereinafter. It will be assumed that the first frequency is $f_0+\Delta f_1$ and the second frequency is $f_0+\Delta f_2$. Different sequences of pulses are conceivable: for example, the pulsed signal can comprise a first series of pulses at the first frequency followed by a second series of pulses at the second frequency. Alternatively, the first and second series can be interlaced.

The receiver has the same architecture as that of FIG. 4 with a single quadrature mixer at the frequency $f_0$. The pulses at the first frequency are translated to the first intermediate frequency $\Delta f_1$ and the pulses at the second frequency are translated to the second intermediate frequency $\Delta f_2$. In the following, a first pulse at a first frequency and a second pulse at a second frequency will be considered.

The first and second frequencies are chosen in the frequency bands allowed for the UWB system in question. For example, if the UWB system complies with IEEE 802.15.4a standard, first and second frequencies belonging to distinct channels of this standard can be used.

Advantageously, $\Delta f_2=-\Delta f_1$ will be chosen, in other words the mixing frequency $f_0$ will be selected as the median frequency of the first and second frequencies.

As in the alternative of the first embodiment, the first pulse is integrated in a first time window and the second pulse is integrated in a second time window. The first and second time windows are chosen to contain the first and second pulses, respectively, as explained previously.

The integration result in the first time window is again noted $r_I^1$ for the in-phase channel and $r_Q^1$ for the quadrature channel. Likewise, the integration result in the second window is noted $r_I^2$ for the in-phase channel and $r_Q^2$ for the quadrature channel.

Once again, the controlling means enable the frequency translation stage and the integration stage to be controlled.

The phase of the integration result for the first pulse is consequently:

$$\Theta^1 = \text{Arc tan}\left(\frac{r_Q^1}{r_I^1}\right) = \Phi^1 + 2\pi \Delta f_1 t_a^1 \quad (17)$$

and that of the integration result for the second pulse:

$$\Theta^2 = \text{Arc tan}\left(\frac{r_Q^2}{r_I^2}\right) = \Phi^2 + 2\pi \Delta f_2 t_a^2 \quad (18)$$

where $\Phi^1-\Phi^2=2\pi f_0 \Delta t_i + \Delta\phi$ with the same notation conventions as previously and where $\Delta\phi$ is the deviation between the transmission phase of the first pulse and the transmission phase of the second pulse.

It will be assumed in the following that the time interval between the first and second time windows is chosen equal to the time interval between the first and second pulses ($\delta t_{21}=0$ and thus $t_a^1=t_a^2=t_a$).

From the arrival time of the UWB signal, $t_a$, the receiver can determine the propagation time between the transmitter and the receiver since they are synchronized, in other words when the receiver knows the transmission time of the UWB signal.

Figure 5A:
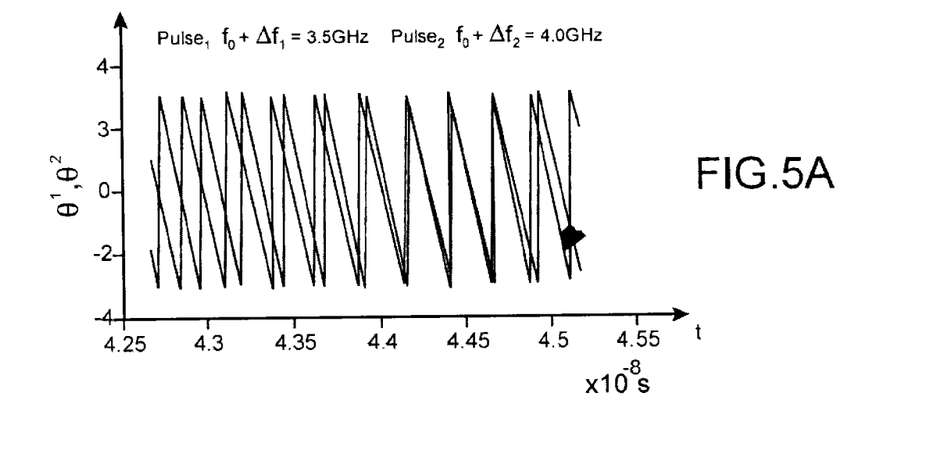
FIG. 5A represents an exemplary phase variation, for two pulses of distinct frequencies, on an arrival time range.

FIG. 5A illustrates the variation of the phase $\Theta^1$ and the phase $\Theta^2$ on an arrival time range. The first frequency $f_0+\Delta f_1$ is herein 3.5 GHz and the second frequency $f_0+\Delta f_2$ is 4 GHz. It is noted that the phase variations are quick for a time variation of the arrival time as low as 3 ns.

Figure 5B:
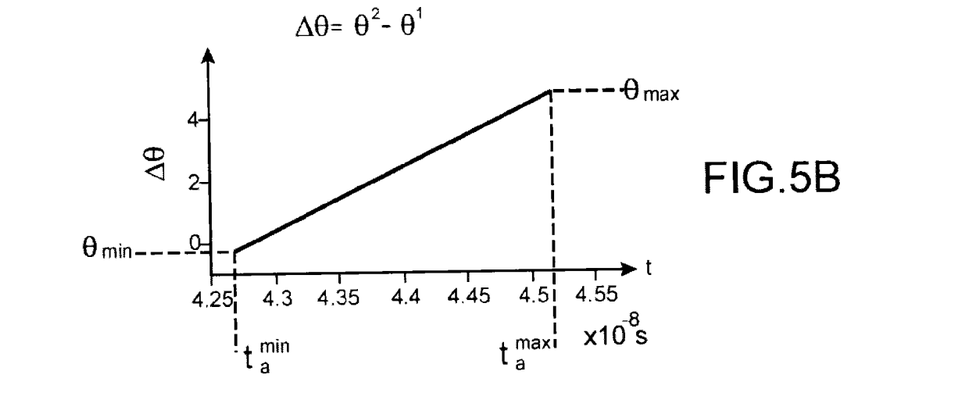
FIG. 5B represents a deviation between phase variations of FIG. 5A on the same arrival time range.
Figure 5C:
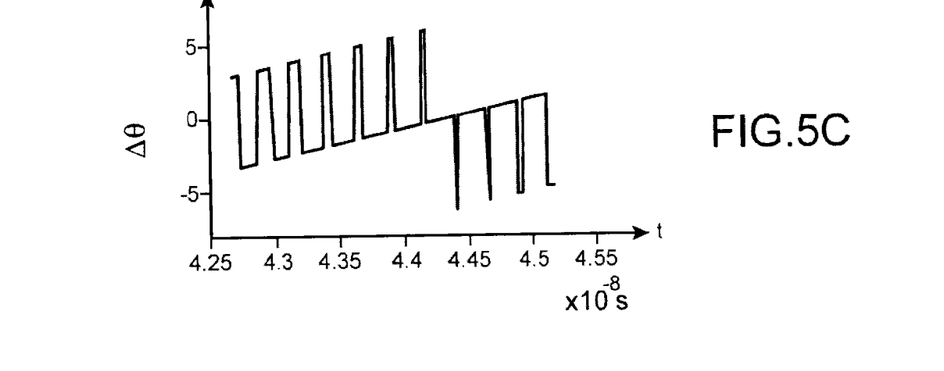
FIG. 5C represents another exemplary deviation between phase variations relating to two pulses of distinct frequencies.

FIG. 5B illustrates the phase deviation $\Delta\Theta=\Theta^2-\Theta^1$ on this same time range of arrival time. It is noticed that the phase deviation changes linearly over time as provided by the expressions (17) and (18).

If $\Delta\phi$ is not known, a calibration of the arrival time estimator is made. More precisely, a first phase deviation, $\Delta\Theta_{min}=\Theta_{min}^2-\Theta_{min}^1$, for a first arrival time, $t_a^{min}$, and a second phase deviation, $\Delta\Theta_{max}=\Theta_{max}^2-\Theta_{max}^1$, for a second arrival time, $t_a^{max}$ are recorded. Let us set $\Delta T=t_a^{max}-t_a^{min}$.

If it is assumed that the variation in phase deviation is linear on the interval $[t_a^{min}, t_a^{max}]$, the arrival time is estimated in 440 by:

$$t_a = t_a^{min} + \frac{\Delta\Theta - \Delta\Theta_{min}}{\Delta\Theta_{max} - \Delta\Theta_{min}} \Delta T \qquad (19)$$

The hypothesis of the phase deviation being linear on the interval $[t_a^{min}, t_a^{max}]$ is confirmed if the rotation of the phase deviation on this interval is lower than $\pi$. It is understood from the equations (17) and (18) that this will be the case if the interval is of a short duration and/or if the frequency deviation $\Delta f_2-\Delta f_1$ is low.

In the opposite case, the curve of the phase deviation periodically has $\pi$ phase hops with a periodicity $\frac{1}{2}|\Delta f_2-\Delta f_1|$ within the interval in question. As a result, there is an ambiguity on the arrival time or, equivalently, on the propagation time between transmitter and receiver. This ambiguity can be removed in different ways, for example by means of a prior coarse synchronization step or even by means of a power measurement giving coarse time information about the propagation distance and, hence, about the arrival time.

The calibration of the phase deviation curve can be made using two measurements $\Delta\Theta_{min}$ and $\Delta\Theta_{max}$ as previously indicated.

In practice, a statistics can be made on the $\Delta\Theta$ values, in the absence of or before any synchronization of the receiver with the transmitter. Alternatively, the $\Delta\Theta$ values can be analyzed during a phase during which the integration windows are slid with respect to the first pulse and the second pulse respectively, the $\Delta\Theta$ values being then recorded as a function of this sliding, that is by scanning the phase deviation curve as a function of the arrival time.

The invention claimed is:

1. A device for determining an arrival time of a received ultra-wide band (UWB) signal comprising at least one pulse modulated at a carrier frequency, said device comprising:
    at least one translation stage for translating to an intermediate frequency, the at least one translation stage comprising a quadrature mixer comprising I and Q mixing channels;
    at least one integration stage connected to the at least one translation stage, for integrating signals delivered on the I and Q channels on a time window and providing integration results for each of the I and Q channels respectively; and
    means for controlling said at least one translation and integration stage for:
        carrying out a first frequency translation of the UWB signal to a first intermediate frequency followed by an integration of the signal thus translated on a first time window to obtain first integration results $r_I^1, r_Q^1$;
        carrying out a second frequency translation of the UWB signal to a second intermediate frequency, different from the first intermediate frequency, followed by an integration of the signal thus translated on a second time window to obtain second integration results $r_I^2, r_Q^2$;
    calculating means for calculating a first phase value $\Theta^1$ from the first integration results according to $$\Theta^1 = \mathrm{Arc}\,\tan\left(\frac{r_Q^1}{r_I^1}\right),$$

a second phase value $\Theta^2$ from the second integration results according to $$\Theta^2 = \mathrm{Arc}\,\tan\left(\frac{r_Q^2}{r_I^2}\right)$$

and deducing therefrom a phase deviation $\Delta\Theta=\Theta^2-\theta^1$, said calculating means determining the arrival time of the received UWB signal from the phase deviation thus obtained by means of a predetermined function.

2. The device according to claim 1, wherein the first and second time windows are combined in a single window and in that the latter is chosen to contain said pulse.

3. The device according to claim 2, wherein said arrival time, counted from the beginning of the single window, is estimated by the predetermined function of:

$$t_a = \frac{\Delta\Theta}{2\pi(\Delta f_2 - \Delta f_1)}$$

where $\Delta\Theta$ is the phase deviation, $\Delta f_1$ is the first intermediate frequency and $\Delta f_2$ is the second intermediate frequency.

4. The device according to claim 1, wherein said UWB signal comprises a first pulse followed by a second pulse, in that the first time window is chosen to comprise the first pulse and the second time window is chosen to comprise the second pulse.

5. The device according to claim 4, wherein said arrival time, counted from the beginning of the first time window is estimated by the predetermined function of:

$$t_a = \frac{\Delta\Theta - 2\pi f_0 \Delta t_i - 2\pi \Delta f_2 \delta t_{21}}{2\pi(\Delta f_2 - \Delta f_1)}$$

where $\Delta\Theta$ is the phase deviation, $f_0$ is the carrier frequency, $\Delta f_1$ is the first intermediate frequency, $\Delta f_2$ is the second intermediate frequency, $\Delta t_i$ is the time interval separating both pulses, $\delta t_{21}=\Delta t_i-\Delta t_w$ where $\Delta t_w$ is the time interval separating the first and second time windows.

6. The device according to claim 4, wherein the time interval between the first and second time windows is selected equal to the time interval between the first and second pulses, the arrival time of the UWB signal, counted from the beginning of the first time window being estimated by the predetermined function of:

$$t_a = t_a^{min} + \frac{\Delta\Theta - \Delta\Theta_{min}}{\Delta\Theta_{max} - \Delta\Theta_{min}} \Delta T$$

where $\Delta\Theta_{min}$ and $\Delta\Theta_{max}$ are phase deviations obtained for a first arrival time $t_a^{max}$ and a second arrival time $t_a^{max}$, respectively, and $\Delta T = t_a^{max} - t_a^{min}$.

7. The device according to claim 1, wherein the predetermined function is given by a calibration curve providing the phase deviation as a function of the arrival time of the signal.

8. The device for determining the arrival time of a UWB signal between a transmitter and a receiver according to claim 7, wherein the curve is obtained via a statistics of the phase deviation values as a function of the arrival time of the signal, in the absence of synchronization of the transmitter and the receiver.

9. A device for determining an arrival time of a received ultra-wide band (UWB) signal comprising a first pulse modulated at a carrier frequency, followed by a second pulse modulated at a second carrier frequency, said device comprising:
   a translation stage for translating to an intermediate frequency, the translation stage comprising a quadrature mixer comprising I and Q mixing channels;
   an integration stage connected to said translation stage, for integrating signals delivered on the I and Q channels on a time window and providing integration results for each of the I and Q channels respectively; and
   means for controlling the translation stage and the integration stage for:
      carrying out a first frequency translation of the UWB signal at an intermediate frequency followed by an integration of the signal thus translated on a first time window to obtain first integration results $r_I^1, r_Q^1$;
      carrying out a second frequency translation of the UWB signal to said intermediate frequency, followed by an integration of the signal thus translated on a second time window to obtain second integration results $r_I^2, r_Q^2$;
   calculating means for calculating a first phase value $\Theta^1$ from the first integration results according to $$\Theta^1 = \text{Arc tan}\left(\frac{r_Q^1}{r_I^1}\right),$$

a second phase value $\Theta^2$ from the second integration results according to $$\Theta^2 = \text{Arc tan}\left(\frac{r_Q^2}{r_I^2}\right)$$

and deducing therefrom a phase deviation $\Delta\Theta = \Theta^2 - \Theta^1$, said calculating means determining the arrival time of the received UWB signal from the phase deviation thus obtained via a predetermined function.

10. The device according to claim 9, wherein the intermediate frequency is the median frequency between the first and second carrier frequencies.

11. A device for determining an arrival time of a received ultra-wide band (UWB) signal comprising at least one pulse modulated at a carrier frequency, said device comprising:
   circuitry configured to
      translate to an intermediate frequency on I and Q mixing channels,
      integrate signals delivered on the I and Q channels on a time window and providing integration results for each of the I and Q channels respectively,
      carry out a first frequency translation of the UWB signal to a first intermediate frequency followed by an integration of the signal thus translated on a first time window to obtain first integration results $r_I^1, r_Q^1$,
      carry out a second frequency translation of the UWB signal to a second intermediate frequency, different from the first intermediate frequency, followed by an integration of the signal thus translated on a second time window to obtain second integration results $r_I^2, r_Q^2$;
      calculate a first phase value $\Theta^1$ from the first integration results according to $$\Theta^1 = \text{Arc tan}\left(\frac{r_Q^1}{r_I^1}\right),$$

a second phase value $\Theta^2$ from the second integration results according to $$\Theta^2 = \text{Arc tan}\left(\frac{r_Q^2}{r_I^2}\right)$$

and deducing therefrom a phase deviation $\Delta\Theta = \Theta^2 - \Theta^1$, and
      determine the arrival time of the received UWB signal from the phase deviation via a predetermined function.

* * * * *